United States Patent [19]

Matsushita et al.

[11] 4,061,596

[45] Dec. 6, 1977

[54] PROCESS FOR PREPARING TITANIUM OXIDE SHAPED CARRIER

[75] Inventors: Kunichi Matsushita, Yokohama; Hikaru Sakurada, Yokkaichi; Kazuhiko Onuma, Machida, all of Japan

[73] Assignee: Mitsubishi Chemical Industries Ltd., Tokyo, Japan

[21] Appl. No.: 636,983

[22] Filed: Dec. 2, 1975

[30] Foreign Application Priority Data

| Dec. 2, 1974 | Japan | 49-137937 |
| Dec. 6, 1974 | Japan | 49-140222 |
| Dec. 6, 1974 | Japan | 49-140223 |
| July 14, 1975 | Japan | 50-86087 |
| July 31, 1975 | Japan | 50-93466 |

[51] Int. Cl.$^2$ .................... B01J 21/00; C04B 35/46; C04B 35/64

[52] U.S. Cl. .................... 252/463; 252/461; 106/73.33; 264/66; 264/63

[58] Field of Search ............... 252/463, 461; 423/239, 423/610; 264/63, 66, 67; 106/73.33, 73.3

[56] References Cited

U.S. PATENT DOCUMENTS

| 1,682,241 | 8/1928 | Patrick | 252/463 |
| 1,682,242 | 8/1928 | Patrick | 252/463 |
| 2,137,135 | 11/1938 | Fuwa et al. | 106/73.33 |
| 2,340,935 | 2/1944 | Connolly | 252/463 |
| 3,173,883 | 3/1965 | Cornelius et al. | 252/463 X |
| 3,279,884 | 10/1966 | Nonnenmacher et al. | 423/239 |
| 3,340,011 | 9/1967 | Hoekstra et al. | 252/463 X |
| 3,547,833 | 12/1970 | Yano et al. | 252/463 |
| 3,579,310 | 5/1971 | Lewis et al. | 423/610 X |
| 3,910,851 | 10/1975 | Messing | 252/463 X |
| 3,928,238 | 12/1975 | Koberstein et al. | 252/463 X |
| 3,937,797 | 2/1976 | Romanski et al. | 423/610 |

FOREIGN PATENT DOCUMENTS

| 6,817,274 | 6/1970 | Netherlands | 252/463 |

OTHER PUBLICATIONS

Kirk Othmer Encyclopedia of Chemical Technology 2nd Ed. vol. 20, pp. 392-394.

Primary Examiner—Patrick P. Garvin
Assistant Examiner—William G. Wright
Attorney, Agent, or Firm—Oblon, Fisher, Spivak, McClelland & Maier

[57] ABSTRACT

A process for preparing a shaped titanium oxide catalyst carrier which comprises calcining titanium oxide at 400° C–800° C as a first calcining step, then shaping the titanium oxide followed by calcining the shaped material at 300° C–800° C as a second calcining step.

16 Claims, No Drawings

PROCESS FOR PREPARING TITANIUM OXIDE SHAPED CARRIER

BACKGROUND OF THE INVENTION

1. Field of the Invention

The present invention relates to a process for preparing a shaped carrier which contains titanium oxide as the primary component. The carriers of this invention are suitable for use as catalyst supports.

2. Description of the Prior Art

Typically, solid catalysts are used in a supported form prepared by depositing the catalytic component on a carrier having the desired shape and diameter or in an unsupported form by forming the catalytic component into the desired shape and diameter. The solid catalysts prepared by either method can be used in either a fixed bed system or in a moving bed system. In either case, it is necessary for the catalyst to have enough strength for use in an industrial operation. When the catalyst is not strong enough, the catalyst disintegrates while being packed into the reactor; or becomes powdered or crushed by gas pressure or heat shock during the reaction to cause clogging in the reactor. In either case, the catalyst is not suitable for practical use.

Titanium oxide has certain desirable characteristics as a catalyst carrier or as a catalyst itself. However, it is difficult to obtain a shaped product having the desired mechanical strength. For example, in order to prepared a shaped product of titanium oxide suitable for use as a catalyst carrier, it is necessary to mold fine powdery titanium dioxide under compression produced by an extrusion molding machine, a tableting machine or a rolling granulator, or in the alternative, to shape it by agglomeration with water or a suitable binder.

With either technique, it is difficult to achieve enough agglomeration and difficult to prepare a shaped product having sufficient strength. On the other hand, it is possible to prepare a shaped product having a high degree of hardness and heat shock resistance by sintering titanium dioxide at temperatures above 1000° C. However, the resulting sintered product has a high density, a low specific surface area, low porosity and is not suitable as a catalyst carrier.

There is then, a need for a process capable of preparing a shaped titanium oxide product which is suitable as a catalyst carrier.

SUMMARY OF THE INVENTION

It is an object of the present invention to provide a shaped titanium oxide product having a specific surface area and porosity which make it suitable for use as a catalyst carrier. This and other objects of the present invention have been attained by preparing shaped titanium oxide by calcining titanium oxide at 400° – 800° C, then shaping it and then calcining the shaped material at 300° – 800° C. The resulting shaped titanium oxide is suitable as a carrier.

DETAILED DESCRIPTION OF THE PREFERRED EMBODIMENTS

As used throughout the specification, titanium oxide means titanium dioxide.

Titanium oxide (titanium dioxide) may be produced by hydrolyzing a titanium salt such as titanium chloride or titanium sulfate, neutralizing and washing with water if desired. In the present invention, the shaped product is prepared by dehydrating or drying a wet cake of titanium oxide, calcining it at 400° – 800° C, shaping it to the desired shape and then calcining it at 300° – 800° C. While the titanium oxide may be used without any additives, it is possible to prepare a stronger shaped titanium oxide product by adding certain additives to the titanium oxide powder prepared in the first heat treatment at 400° – 800° C. The resulting shaped titanium oxide products possess desired physical characteristics of a carrier.

Precursors of titanium oxide, such as titanium hydroxides, titania sols or titanic acid esters are some of the desired additives. Titanium hydroxides include orthotitanic acid and metatitanic acid produced by hydrolyzing a titanate or titanic acid ester. The titanium hydroxides are easily converted to titanium oxide by heating.

Suitable titania sols include the sol-type of titanium hydroxides which form a colloidal dispersion in solution. The titania sols can be produced by conventional methods from titanium sulfate, titanium tetrachloride, etc. An improved process for producing titania sol from titanium tetrachloride is disclosed in Japanese Unexamined Patent Publication No. 108000/1974. Titania sol can also be easily produced from titanic acid esters, because the titanium hydroxide particles produced by hydrolysis of the titanic acid ester are fine and have a high dispersibility. Typical titanic acid esters are esters of orthotitanic acid and an alcohol and have the formula $Ti(OR)_4$, wherein R represents a methyl, ethyl, isopropyl, butyl, hexyl or stearyl group.

The precursors of titanium oxide can be directly mixed with the titanium oxide powder resulting from the first heat treatment. However, from the view point of titanium hydroxide distribution, it is preferable to mix the precursor by adding titanium oxide powder to a solution of a titanate such as titanium tetrachloride and then hydrolyzing the titanate by adding an alkali e.g. ammonia water with stirring. The amount of the precursor of titanium oxide added is usually in a range of 0.1 – 50 wt.% preferably 0.1 – 20 wt.% calculated as $TiO_2$ to total product.

Other additives which may be added to the titanium oxide powder prepared by the first heat treatment include alumina and precursors of alumina. Alumina includes powdery $\gamma$-alumina, $\eta$-alumina, $\theta$-alumina, etc. which are produced by the thermal decomposition of alumina hydrates using the conventional methods. It is possible to use alumina hydrates such as boehmite without any dehydration, however. The amount of alumina present is usually in the range of 0.1 – 20 wt.% to total product.

The alumina precursors which may be added include alumina sols and aluminum salts. The alumina sols may be commercially available alumina sol and sol-type products prepared by dispersing alumina gel.

The suitable aluminum salts, which are converted to alumina by calcination, include aluminum nitrate, aluminum acetate, etc. Aluminum hydroxide precipitated by adding an alkali to said aluminum salt may be also used. The amount of aluminum salt or aluminum hydroxide added is usually in a range of 0.1 – 20 wt.% calculated as $Al_2O_3$ to total product.

It is possible to improve strength of the shaped titanium oxide product by adding less than 10 wt.% of an inorganic powder such as diatomaceous earth or glass powder to the titanium oxide.

The titanium oxide prepared by the first heat treatment or a mixture of said titanium oxide and a precursor of titanium oxide or a precursor of alumina is shaped into the desired shape. It is advantageous to add an acid to the titanium powder before the shaping operation to improve strength of the shaped material in the second step or the resulting shaped product of the second step. Suitable acids include mineral acids such as sulfuric acid, nitric acid, hydrochloric acid, etc., and organic acids such as formic acid, acetic acid, oxalic acid, propionic acid, butyric acid, maleic acid, chloroacetic acid and the like. Nitric acid and acetic acid are remarkably effective in increasing the strength. The amount of the acid added is in the range of 0.01 – 50 wt. parts, preferably 0.1 – 10 wt. parts of titanium oxide.

It is preferred to add a binder before shaping the calcined titanium oxide powder. Polyvinyl alcohol is a remarkably superior binder. The addition of polyvinyl alcohol increases the strength of the shaped product without adversely effecting the physical properties, such as specific surface area, water absorption coefficient, etc. of the shaped product prepared by extruding the calcined titanium oxide mixture and then granulating with a rolling granulator. It is preferred to use a commercial polyvinyl alcohol having a polymerization degree of higher than 50, with the best results being obtained when it is higher than 100. The polyvinyl alcohol is usually used by dissolving it in an aqueous medium. The amount of polyvinyl alcohol added is in the range of 0.1 – 10 wt.%, preferably 1 – 5 wt.% based on titanium oxide.

The shape of the shaped titanium oxide shaped products may be spherical shape, tablets, cylindrical shape, pellets, granules, honeycomb shape and the like which have the desired size. The shapes are prepared using suitable molding machines such as a tableting machine, an extrusion molding machine, a rolling granulator, a pelletor or a combination of the extrusion molding machine and the rolling granulator. When tablets are to be prepared, the titanium oxide powder which has been calcined at 400° – 800° C or a mixture of said titanium oxide and an inorganic compound such as alumina, glass powder, diatomaceous earth, or the like is shaped into tablets by a tableting machine. If a cylindrical shaped product is to be prepared, a mixture of the calcined titanium oxide powder from the first calcination and water or an aqueous solution of an acid, is shaped by an extrusion molding machine. It is preferred to mix said titanium oxide powder with a precursor of titania, alumina or a precursor of alumina and, if desired, glass powder, diatomaceous earth and the like and then to add the water or acid, followed by shaping the mixture by extrusion molding.

When the shaped material prepared by the extrusion molding is to be granulated into a spherical shape by a rolling granulator, it is desirable to mix polyvinyl alcohol with the titanium oxide powder. For example, the titanium oxide powder is mixed with an aqueous solution prepared by dissolving polyvinyl alcohol in a water or acid solution, the mixture is then kneaded to form a uniform mixture, it is extruded by an extrusion molding machine, cut to the desired length by a cutter (or it is preliminarily dried) and is then granulated by rolling it at high speed by a rolling granulator. The plasticity of the treated material is improved by the addition of the polyvinyl alcohol and the granulation proceeds smoothly to obtain spherical or elliptic-spherical granules in high efficiency under high compression compared without the addition of polyvinyl alcohol.

It is possible to increase strength of the shaped product by contacting the resulting shaped material prepared in this manner with an acid before calcining it at 300° – 800° C (the second calcination). When an acid is added before the shaping operation, the increased strength is obtained without contacting the shaped material with an acid before calcining. Suitable acids for contacting with the shaped material are mineral acids such as nitric acid, sulfuric acid, hydrochloric acid, and organic acids such as formic acid, acetic acid, propionic acid, oxalic acid, butyric acid, chloroacetic acid or the like. Nitric acid and acetic acid are remarkably effective. The concentration of the acid is not critical and is in the range of 0.0001% to high concentrations, and preferably is from 0.001 – 100%.

The shaped material can be contacted with the acid by dipping said shaped material in the desired concentration of acid for 1 to several hours. Typically, the shaped material is taken up and washed by dipping it in water for several times. The resulting shaped material (with or without the acid treatment) is dried and then calcined. The calcination is conducted at temperatures below 800° C, preferably at 300° – 800° C in an inert gas atmosphere or in air. It is preferable to calcine at relatively low temperatures in order to obtain a high specific surface area and porosity. When the temperature of the calcination is above 1000° C, the strength is increased by the sintering that occurs and becomes dense and the physical properties necessary for a suitable catalyst carrier are not obtained. The time of the calcination affects the physical properties and strength of the shaped product, and is preferably in a range of 1 – 10 hours.

The resulting shaped product has the desired mechanical strength to be durable enough to use in an industrial operation, and has desirable physical properties such as specific surface area, porosity and the like, which make it suitable for use as a catalyst carrier.

The resulting shaped product may be used as a catalyst or as a catalyst carrier for gas phase reactions, it has the advantages of low abrasion loss, low pressure loss and good handling characteristics. For example, when a vanadium oxide catalyst is supported on the shaped product of the present invention as the carrier is used as a catalyst for reducing nitrogen oxides with ammonia, high catalytic activity is maintained for a long period and crushing and powdering problems are not encountered during long periods of operation.

Having generally described the invention, a further understanding can be obtained by reference to certain examples which are provided for purpose of illustration only and are not intended to be limiting unless otherwise specified. In the following examples, the terms "part" and "percent" are by weight unless otherwise specified.

In the examples and reference examples, the mechanical strength was measured by Hardness tester (manufactured by Kiya Seisakusho, Ltd.), the specific surface area was measured by the BET nitrogen gas adsorption method and porosity was measured as a water absorption coefficient.

The water absorption coefficient was measured by dipping a sample in water for 3 hours, measuring weights before and after dipping and calculated by the following equation:

$$\text{Water absorption} = \frac{\text{wet wt.} - \text{dried wt.}}{\text{dried wt.}} \times 100.$$

The method of measuring the mechanical strength was as follows:

For tablets, two parallel flat plates of the Hardness tester were contacted with each surface of cylindrical tablet having a diameter of 7mm and a thickness of 2mm as a surface contact.

For the extrusion molded product, the plates of the Hardness tester were contacted with each curved surface of a pellet having a diameter of 5mm and a length of 10mm, as a linear contact.

For spherical shaped products, the plates of the Hardness tester were contacted as a point contact.

In the examples and reference examples, an average compression strength is abbreviated as C.S.

The average specific surface area is abbreviated as S.S.A.; and the average water absorption is abbreviated as W.A.

EXAMPLE 1

Titanium sulfate was hydrolyzed, neutralized and washed with water to produce a wet cake of titanium hydroxide. The wet cake was dried and calcined at 500° C for 3 hours to obtain titanium dioxide powder. An aqueous solution of titanium tetrachloride was produced by gradually adding 13.76 ml of titanium tetrachloride to 1.5 liters of water cooled with ice, while stirring. To the aqueous solution, 190 g of said titanium dioxide powder was added with stirring, and then 4N—NH$_4$OH was gradually added to the mixture to adjust the pH to 7. The amount of 4N—NH$_4$OH added was about 120 ml. The resulting slurry of titanium dioxide and titanium hydroxide was filtered and the resulting cake was washed with water three times and then dried at 150° C for one night. The resulting mixture of titanium dioxide and titanium hydroxide was mixed with 126 ml of water and blended by a grind mill (with pestle) (manufactured by Ishikawa Kojo K.K.) and the mixture was shaped by an extrusion molding machine having a diameter of die of 5 mm (manufactured by Fuji Powdal K.K.). The shaped material was dried and calcined at 600° C for 3 hours. The resulting shaped product of titanium oxide included 5 wt.% of TiO$_2$ derived from titanium tetrachloride and had a compression strength (C.S.) of 10.4 Kg; a specific surface area (S.S.A.) of 49.0 m$^2$/g and a water absorption (W.A.) of 33% as average data.

EXAMPLE 2

Titanium sulfate was hydrolyzed, neutralized and washed with water to produce a wet cake of titanium hydroxide. The wet cake was dired and calcined at 600° C for 6 hours to obtain titanium dioxide powder. 200 g of the resulting titanium dioxide powder was mixed with 118 ml of an aqueous solution produced by dissolving 6 g of polyvinyl alcohol (polymerization degree of about 500 manufactured by Wakojunyaku Kogyo K.K.) in water. The mixture was kneaded in the grind mill (with pestle) for about 1 hour. The mixture was extruded from the extrusion molding machine and cut by a cutter equipped shaft of the machine. The resulting pellets were granulated to form spherical pellets by a rotary granulator having a rolling pan (diameter of 23 cm) (spherizer) (manufactured by Fuji Denki K.K. Type 0-230). The resulting shaped material was dried and calcined at 700° C for 3 hours in air-stream. The resulting spherical shaped product had C.S. of 3.1 Kg and S.S.A. of 40.2 m$^2$/g and W.A. of 40%.

EXAMPLE 3

200 g of the titanium dioxide powder of Example 1 was mixed with 110 ml of 6% aqueous solution of nitric acid and the mixture was kneaded and extruded by an extrusion molding machine (pelletter) to form pellets having a diameter of 5 mm and a length of 10 mm. The pellets were dried and calcined at 600° C for 3 hours in air-stream. The resulting shaped product had C.S. of 9.4 Kg, S.S.A. of 63.3 m$^2$/g and W.A. of 42%.

EXAMPLE 4

200 g of the titanium dioxide powder of Example 1 was mixed with 107 ml of 1% aqueous solution of nitric acid and the mixture was kneaded, extruded, dried and calcined (second step) in accordance with the process of Example 1. The resulting shaped product had C.S. of 5.8 Kg, S.S.A. of 66.2 m$^2$/g and W.A. of 45%.

EXAMPLE 5

200 g of the titanium dioxide powder of Example 1 was mixed with 100 ml of 10% aqueous solution of acetic acid. The mixture was kneaded, extruded, dried and calcined (second step) in accordance with the process of Example 1. The resulting shaped product had C.S. of 7.2 Kg, S.S.A. of 60.1 m$^2$/g and W.A. of 30%.

EXAMPLE 6

200 g of the titanium dioxide powder of Example 1 was mixed with 117 ml of 10% aqueous solution of oxalic acid. The mixture was kneaded, extruded, dried and calcined (second step) in accordance with the process of Example 1. The resulting shaped product had C.S. of 8.9 kg, S.S.A. of 62.2 m$^2$/g and W.A. of 45%.

EXAMPLE 7

200 g of the powder mixture of titanium dioxide and titanium hydroxide of Example 1 was mixed with 107 ml of 5% aqueous solution of acetic acid. The mixture was kneaded, extruded, dried and calcined at 600° C for 3 hours in air-stream in accordance with the process of Example 1. The resulting shaped product had C.S. of 12.1 Kg, S.S.A. of 50.2 m$^2$/g and W.A. of 43%.

EXAMPLE 8

The process of Example 1 was repeated except using 27.52 ml of titanium tetrachloride instead of 13.76 ml of titanium tetrachloride and 180 g of titanium dioxide powder instead of 190 g of titanium dioxide powder to obtain a powder mixture of titanium dioxide and titanium hydroxide. The powder mixture was mixed with 83 ml of 5% aqueous solution of acetic acid. The mixture was kneaded and extruded by the extrusion molding machine as Example 1 and was dried and calcined at 600° C for 3 hours. The resulting shaped product had 10 wt.% of TiO$_2$ derived from TiCl$_4$ and C.S. of 11.5 Kg S.S.A. of 47.5 m$^2$/g and W.A. of 45%.

EXAMPLE 9

An aqueous solution of titanium tetrachloride was produced by gradually adding 13.2 ml of titanium tetrachloride to 190 ml of water cooled with ice. The solution was gradually added to 2 liters of aqueous solution of ammonium hydroxide having a concentration of 0.175 mol/liter, while stirring. The mixture was stirred for 30 minutes and allowed to stand. The supernatant liquid was separated by decantation, 2.2 liter of water was added for washing and the supernatant liquid was removed after 2 hours of standing. The residue was mixed with 1.76 liter of water and 33.5 ml of 1 molar nitric acid to adjust pH of the slurry to 3.3. The slurry was stirred for 30 minutes, the allowed to stand. The supernatant liquid was removed and washed with water two times in the same manner as done previously. The final supernatant liquid had pH of 3.9. The volume of the slurry was 400 ml. The slurry was mixed with 7.5 ml of 1 molar nitric acid and stirred for 30 minutes. The resulting slurry, which had a pH of 2.3, was aged at 20° C for 14 days to obtain a pale blue translucent titania sol. 200 g of the titanium dioxide powder of Example 1 was mixed with 106 ml of said titania sol and 10 ml of nitric acid. The mixture was kneaded and extruded by the extrusion molding machine as in Example 1. It was then dried and calcined at 600° C for 3 hours in air-stream. The resulting shaped product included 1.5 wt.% of $TiO_2$ derived from titania sol and had C.S. of 11.2 Kg, S.S.A. of 53.8 $m^2/g$ and W.A. of 47%.

EXAMPLE 10

Titanium sulfate was hydrolyzed, neutralized with ammonia water and washed with water for several times to produce titanium hydroxide which was then dried. 20 g of the dried titanium hydroxide was mixed with 180 g of the titanium dioxide powder of Example 2 and 6 g of crystalline cellulose as an auxiliary molding agent (manufactured by Asahi Kasei K.K.; TG-101). The mixture was mixed with 115 ml of 5% aqueous solution of acetic acid. The mixture was kneaded then extruded by the extrusion molding machine as in Example 1. The shaped material was dried and calcined at 700° C for 3 hours in air-stream. The resulting shaped product had C.S. of 9.9 Kg, S.S.A. of 42.7 $m^2/g$ and W.A. of 44%.

EXAMPLE 11

190 g of the titanium dioxide powder of Example 2 was mixed with 1 liter of ethanol, and then a solution of 37.2 ml of titanium tetraisopropoxide $Ti(OC_3H_7)_4$ (manufactured by Mitsuwa Kagaku Yakuhin K.K.; 10 g as $TiO_2$) in 100 ml of ethanol was added. The mixture was stirred for 30 minutes and then 100 ml of water was added to the mixture with stirring. The precipitate was filtered and dried at 100° C for 5 hours. The dried material was mixed with 90 ml of a 5% aqueous solution of acetic acid. The mixture was kneaded and extruded by the extrusion molding machine as Example 1. The shaped material was dried and calcined at 600° C for 3 hours in air-stream. The resulting shaped product had C.S. of 12.5 Kg, S.S.A. of 55.6 $m^2/g$ and W.A. of 40%.

EXAMPLE 12

200 g of the titanium dioxide powder of Example 2 was mixed with 117 ml of a 5% aqueous solution of acetic acid in which 6 g of polyvinyl alcohol (polymerization degree of about 500) was dissolved. The mixture was kneaded by a grind mill (with pestle) for about 1 hour, extruded, cut and granulated to form spherical pellets by the spherizer as Example 2. The shaped material was dried and calcined at 700° C for 3 hours in airstream. The resulting spherical shaped product had C.S. of 3.9 Kg, S.S.A. of 41.8 $m^2/g$ and W.A. of 42%.

EXAMPLE 13

The process of granulation and calcination of Example 2 was repeated except using 118 ml of a 5% aqueous solution of acetic acid in which 4 g of polyvinyl alcohol was dissolved. The resulting spherical shaped product had C.S. of 2.9 Kg, S.S.A. of 45.8 $m^2/g$ and W.A. of 41%.

EXAMPLE 14

200 g of the titanium dioxide powder of Example 2 was mixed with 134 ml of a 5% aqueous solution of acetic acid in which 6 g of polyvinyl alcohol (polymerization degree of about 2000) was dissolved. The mixture was kneaded by the grind mill (with pestle) for about 1 hour, extruded, cut and dried at 50° C for 10 - 15 minutes. It was cut and granulated to form spherical pellets by the spherizer as Example 2. The shaped material was dried and calcined at 700° C for 3 hours in air-stream. The resulting spherical shaped product had C.S. of 3.9 Kg, S.S.A, of 42.3 $m^2/g$ and W.A. of 44%.

EXAMPLE 15

9 wt. parts of the titanium dioxide powder of Example 1 was mixed with 1 wt. part of γ-alumina by a mixer mill for 30 minutes. 200 g of the mixture were mixed with 110 ml of a 6% aqueous solution of nitric acid. The mixture was kneaded and extruded by the extrusion molding machine as Example 1. The shaped material was dried and calcined at 600° C for 3 hours in airstream. The resulting shaped product had C.S. of 12.2 Kg, S.S.A. of 64.5 $m^2/g$ and W.A. of 48%.

EXAMPLE 16

200 g of a mixture of titanium dioxide powder and γ-alumina (9 : 1) of Example 15 was mixed with 105 ml of a 10% aqueous solution of acetic acid. The mixture was kneaded, extruded and calcined as in Example 1. The resulting shaped product had C.S. of 11.0 Kg, S.S.A. of 68.1 $m^2/g$ and W.A. of 46%.

EXAMPLE 17

200 g of a mixture of the titanium dioxide powder of Example 1 and boehmite at a weight ratio of 9 : 1 was mixed with 118 ml of 3% aqueous solution of nitric acid. The mixture was kneaded, extruded and calcined as Example 1. The resulting shaped product had C.S. of 11.1 Kg, S.S.A. of 56.9 $m^2/g$ and W.A. of 49%.

EXAMPLE 18

190 g of the titanium dioxide powder of Example 1 was mixed with 133 g of alumina sol (CATALOID-AS 7.5% solution manufactured by Shokubai Kasei Kogyo K.K.) and 17 ml of a 5% aqueous solution of acetic acid. The mixture was kneaded, extruded, dried and calcined at 600° C for 3 hours in an air-stream as in Example 1, to obtain a shaped product of titanium oxide containing 5 wt.% of alumina. The shaped product had C.S. of 13.5 Kg, S.S.A. of 74.0 $m^2/g$ and W.A. of 45%.

EXAMPLE 19

198 g of the titanium dioxide powder of Example 1 was mixed with 117 ml of a 3% aqueous solution of nitric acid in which 14.7 g of aluminum nitrate (Al(-$NO_3)_3.9H_2O$) was dissolved. The mixture was kneaded, extruded, dried and calcined at 600° C for 3 hours as in Example 1 to obtain a shaped product of titanium dioxide containing 1 wt.% of alumina. The shaped product had C.S. of 13.7 Kg, S.S.A. of 65.3 m²/g and W.A. of 45%.

EXAMPLE 20

180 g of the titanium dioxide powder of Example 1 was mixed with an aqueous solution of 147.2 g of aluminum nitrate (Al(NO$_3$)$_3$.9H$_2$O) in 1.5 liters of water, and 4N-NH$_4$OH was gradually added to the slurry with stirring to adjust the pH to 7. The amount of 4N-NH$_4$OH added was 550 ml. After the addition, the stirring was continued for 3 hours, then the slurry was allowed to stand for one day and was then filtered. The filter cake was mixed with 3 liters of water with stirring and the slurry was filtered, and the operation repeated. The filter cake was dried at 150° C for 1 day. The dried powder was mixed with 115 ml of a 3% aqueous solution of nitric acid. The mixture was kneaded and extruded by the extrusion molding machine. The shaped material was dried and calcined at 600° C for 3 hours to obtain a shaped product of titanium oxide containing 10 wt.% of alumina. The shaped product had C.S. of 14.9 Kg, S.S.A. of 56.9 m²/g and W.A. of 49%.

EXAMPLE 21

The titanium dioxide powder of Example 1 was tableted by a tableting machine to form tablets having a diameter of 7 mm and thickness of 2 mm. The tablets were calcined at 600° C for 3 hours in an air-stream in an electric furnace to yield a preliminarily calcined tablet. The preliminarily calcined tablets were dipped in a concentrated nitric acid (about 60% HNO$_3$) for 1 hour and then was washed with water several times. The tablets were dried and calcined at 500° C for 3 hours in an air-stream in an electric furnace. The resulting shaped product had C.S. of 27.3 Kg/tablet, S.S.A. of 60.9 m²/g and W.A. of 32%.

EXAMPLE 22

The preliminarily calcined tablets of titanium dioxide of Example 21 were dipped in 0.01% aqueous solution of nitric acid for 1 hour and washed with water. The tablets were then dried and calcined as Example 21. The resulting shaped product had C.S. of 29.0 Kg/tablet, S.S.A. of 78.9 m²/g and W.A. of 34%.

EXAMPLE 23

The preliminarily calcined tablets of titanium dioxide of Example 21 were dipped in 6% of aqueous solution of nitric acid, and washed with water. The tablets were then dried and calcined as Example 21. The resulting shaped product had C.S. of 35.6 Kg/tablet, S.S.A. of 79.7 m²/g and W.A. of 35%.

EXAMPLE 24

The preliminarily calcined tablets of titanium dioxide of Example 21 were dipped in acetic acid for 1 hour and washed with water. The tablets were then dried and calcined as Example 21. The resulting shaped product had C.S. of 28.1 Kg/tablet, S.S.A. of 69.6 m²/g and W.A. of 36%.

EXAMPLE 25

The titanium dioxide powder of Example 2 was tableted by a tableting machine to obtain tablets having a diameter of 7 mm and a thickness of 2 mm. The tablets were calcined at 700° C for 3 hours in an air-stream in an electric furnace to yield a preliminarily calcined tablet. The preliminarily calcined product was dipped in concentrated nitric acid (about 60% HNO$_3$) for 1 hour, and washed with water. The tablets were then dried and calcined as Example 21. The resulting shaped product had C.S. of 32.6 Kg/tablet, S.S.A. of 50.2 m²/g, and W.A. of 28%.

EXAMPLE 26

200 g of the titanium dioxide powder of Example 1 was mixed with 130 ml of water. The mixture was kneaded by a grind mill (with pestle) and was dried and extruded by the extrusion molding machine, and was calcined at 600° C for 3 hours in air-stream to yield a preliminarily calcined product. The preliminarily calcined product was dipped in concentrated nitric acid for 1 hour, then washed with water and calcined as Example 21. The resulting shaped product had C.S. of 4.1 Kg, S.S.A. of 65.8 m²/g and W.A. of 49%.

EXAMPLE 27

In a mixer mill 9 wt. parts of the titanium dioxide powder of Example 1 were mixed with 1 wt. part of γ-alumina. The powder mixture was tableted by a tableting machine to obtain tablets having a diameter of 7 mm and a thickness of 2 mm. The tablets were calcined at 600° C for 3 hours in air-stream in an electric furnace to yield preliminarily calcined tablets. The preliminarily calcined tablets were dipped in concentrated nitric acid for 1 hour, washed with water, dried and calcined at 500° C for 3 hours in an air-stream. The resulting shaped product had C.S. of 40.8 Kg/tablet, S.S.A. of 64.3 m²/g and W.A. of 35%.

EXAMPLE 28

The preliminarily calcined product of titanium oxide containing alumina of Example 27 was dipped in 0.6% aqueous solution of nitric acid for 1 hour, washed with water, dried and calcined as Example 27. The resulting shaped product had C.S. of 31.4 Kg/tablet, S.S.A. of 64.6 m²/g and W.A. of 35%.

EXAMPLE 29

The preliminarily calcined tablets of titanium oxide containing alumina of Example 27 were dipped in 10% aqueous solution of acetic acid for 1 hour, washed with water, dried and calcined as Example 27. The shaped product had C.S. of 30.0 Kg/tablet, S.S.A. of 74.9 m²/g and W.A. of 32%.

EXAMPLE 30

The preliminarily calcined tablets were prepared by the process of Example 27 except using 95 : 5 of titanium oxide to γ-alumina. The tablets were dipped in concentrated nitric acid for 1 hour, washed with water, dried, and calcined as in Example 27. The resulting shaped product had C.S. of 33.6 Kg/tablet, S.S.A. of 64.3 m²/g and W.A. of 31%.

EXAMPLE 31

200 g of the mixture of titanium dioxide and γ-alumina of Example 27 was mixed with 120 ml of water and the mixture was extruded by an extrusion molding machine, dried and calcined at 600° C for 3 hours in an air-stream. The product was dipped in concentrated nitric acid for 1 hour, washed with water for several hours, dried and calcined at 500° C for 3 hours in an air-stream. The resulting product had C.S. of 5.5 Kg, S.S.A. of 60.0 m²/g and W.A. of 46%.

COMPARATIVE TEST 1

The preliminarily calcined tablet of Example 21 was calcined at 600° C for 3 hours in air-stream without contacting it with any acid. The resulting shaped product had C.S. of 13.3 Kg/tablet, S.S.A. of 67.5 m²/g, and W.A. of 34%. (Cf:Exp. 21, 22, 23 and 24).

COMPARATIVE TEST 2

The preliminarily calcined tablet of Example 25 was calcined at 700° C for 3 hours in an air-stream without contacting it with any acid. The shaped product had C.S. of 18.7 Kg/tablet, S.S.A. of 54.9 m²/g and W.A. of 30% (Cf. Exp. 25).

COMPARATIVE TEST 3

Pellets prepared by kneading 200 g of the titanium dioxide of Example 1 with water and extruding the mixture were calcined at 600° C for 3 hours in air-stream without contacting the pellets with any acid. The shaped product had C.S. of 2.6 Kg, S.S.A. of 73.2 m²/g and W.A. of 53%. (Cf. Exp. 1, 3, 4, 5, 6, 7, 8, 9, 10, 11, 18, 19, 20 and 26).

COMPARATIVE TEST 4

The preliminarily calcined tablets of titanium dioxide containing γ-alumina of Example 27 were dried and calcined as Example 27. The resulting shaped product had C.S. of 25.6 Kg/tablet, S.S.A. of 64.3 m²/g, and W.A. of 32%. (Cf. Exp. 27, 28, 29, 30).

COMPARATIVE TEST 5

200 g of the mixture of titanium dioxide and -alumina at a weight ratio of 9 : 1 was mixed with 120 ml of water and the mixture was kneaded, extruded and calcined as in Example 1, however, without contacting it with any acid. The resulting shaped product had C.S. of 4.1 Kg, S.S.A. of 60.1 m²/g and W.A. of 49%. (Cf. Exp. 15, 16, 17 and 31).

COMPARATIVE TEST 6

200 g of the titanium dioxide of Example 2 was mixed with 110 ml of a 5% aqueous solution of acetic acid. The mixture was kneaded by a grind mill, extruded, cut and granulated by the spherizer to form spherical pellets which were dried and calcined at 700° C for 3 hours as in Example 2 without any preliminary calcination. A yield of the spherical pellets was low and the spherical pellet had a C.S. of 0.4 Kg. (Cf. Exp. 2, 12, 13 and 14.

COMPARATIVE TEST 7

200 g of the titanium dioxide of Example 2 and 6 g of crystalline cellulose (TG 101 manufactured by Asahi Kasei Kogyo K.K.) were mixed with 120 ml of a 5% aqueous solution of acetic acid. The mixture was kneaded by the grind mill, extruded, cut and granulated by the spherizer to form spherical pellets which were dried and calcined at 700° C for 3 hours in an air-stream as in Example 2 with any preliminary calcination. A yield of spherical product was low. The spherical pellet had C.S. of 1.0 Kg. (Cf. Exp. 2, 12, 13 and 14).

COMPARATIVE TEST 8

200 g of the titanium dioxide of Example 2 was admixed with 128 ml of an aqueous solution of 16.6 g of starch instead of polyvinyl alcohol. The mixture was kneaded by the grind mill, extruded, cut and granulated by the spherizer as in Example 2. However, spherical pellets could not be obtained. (Cf. Exp. 2, 12, 13, and 14).

Test 1

Into 20 ml of an aqueous solution of vanadium oxalate were prepared by dissolving 2.51 g of vanadium pentaoxide and 5.76 g of oxalic acid in water, into which 20 ml of the carrier of Example 3 was dipped for 3 hours. The residual solution was filtered and the solid was dried and calcined at 500° C for 3 hours in an air-stream to obtain a catalyst containing 5 wt.% of vanadium oxide supported on the titanium oxide carrier.

The catalyst was used to test for the reduction of $NO_x$. The results are shown in Table 1. The test was performed by passing a mixed gas containing 10 vol. % of oxygen, 5 vol. % of carbon dioxide, 5 vol. % of water, 2000 ppm of $NO_x$, 3000 ppm of ammonia and residual nitrogen through 15 ml of the catalyst at a space velocity of 20,000 hr$^{-1}$, to test for the reduction of $NO_x$. The $NO_x$ content was measured by Chemiluminescent $NO_x$ meter (manufactured by Shimazu Seisakusho K.K. CLM-201 type). $NO_x$ reduction was calculated by the following equation.

$$NO_x \text{ reduction (\%)} = \frac{NO_x(\text{inlet}) - NO_x(\text{outlet})}{NO_x(\text{inlet})} \times 100$$

In the following tests, vanadium oxide was supported on each carrier in the same manner as Test 1 and the catalytic activity was tested by the reduction of $NO_x$.

Test 2

Into 20 ml of an aqueous solution of vanadium oxalate produced by dissolving 2.34 g of vanadium pentaoxide and 5.38 g of oxalic acid in water, 20 ml of the carrier of Example 6 was dipped for 3 hours. The solid was filtered, dried and calcined as in Test 1 to obtain a catalyst containing 5 wt.% of vanadium oxide supported on titanium oxide carrier. The results of the reduction of $NO_x$ by using the catalyst are shown in Table 1.

Test 3

Into 20 ml of an aqueous solution of vanadium oxalate produced by dissolving 2.51 g of vanadium pentaoxide and 5.76 g of oxalic acid in water, 20 ml of the carrier of Example 12 was dipped for 3 hours. The solid was filtered, dried and calcined at 500° C for 3 hours in an air-stream to obtain a catalyst containing 5 wt.% of vanadium oxide supported on the titanium oxide carrier. The results of the reduction of $NO_x$ by using the catalyst are shown in Table 1.

Test 4

Into 20 ml of an aqueous solution of vanadium oxalate produced by dissolving 2.39 g of vanadium pentaoxide and 5.50 g of oxalic acid in water, 20 ml of the carrier of Example 14 was dipped for 3 hours. The solid was filtered, dried, and calcined at 500° C for 3 hours in an airstream to obtain a catalyst containing 5 wt.% of vanadium oxide supported on the titanium oxide carrier. The results of the reduction of $NO_x$ by using the catalyst are shown in Table 1.

Test 5

Into 20 ml of an aqueous solution of vanadium oxalate produced by dissolving 2.45 g of vanadium pentaoxide and 5.63 g of oxalic acid in water, 20 ml of the carrier of Example 7 was dipped for 3 hours. The solid was filtered, dried and calcined at 500° C for 3 hours in an air-stream to obtain a catalyst containing 5 wt.% of vanadium oxide supported on the titanium oxide carrier.

The results of the reduction of $NO_x$ by using the catalyst are shown in Table 1.

Test 6

Into 20 ml of an aqueous solution of vanadium oxalate produced by dissolving 2.23 g of vanadium pentaoxide and 5.15 g of oxalic acid in water, 20 ml of the carrier of Example 9 was dipped for 3 hours. The solid was filtered, dried and calcined at 500° C for 3 hours in an airstream to obtain a catalyst containing 5 wt.% of vanadium oxide supported on the titanium oxide carrier. The results of the reduction of $NO_x$ by using the catalyst are shown in Table 1.

Test 7

Into 20 ml of an aqueous solution of vanadium oxalate produced by dissolving 2.29 g of vanadium pentaoxide and 5.26 g of oxalic acid in water, 20 ml of the carrier of Example 16 was dipped for 3 hours. The solid was filtered, dried and calcined as in Test 1 to obtain a catalyst containing 5 wt.% of vanadium oxide supported on the titanium dioxidealumina carrier. The results of the reduction of $NO_x$ by using the catalyst are shown in Table 1.

Test 8

Into 20 ml of an aqueous solution produced by dissolving 2.19 g of vanadium pentaoxide and 5.04 g of oxalic acid in water, 20 ml of the carrier of Example 15 was dipped for 3 hours. The solid was filtered, dried and calcined as in Test 1 to obtain a catalyst containing 5 wt.% of vanadium oxide supported on the titanium dioxide-alumina carrier. The results of the reduction of $NO_x$ by using the catalyst are shown in Table 1.

Test 9

Into 20 ml of an aqueous solution of vanadium oxalate produced by dissolving 3.01 g of vanadium pentaoxide and 6.92 g of oxalic acid in water, 20 ml of the carrier of Example 23 was dipper for 3 hours. The solid was filtered, dried and calcined at 500° C for 3 hours in an air-stream to obtain a catalyst containing 5 wt.% of vanadium oxide supported on titanium oxide carrier. The results of the reduction of $NO_x$ by using the catalyst are shown in Table 1.

Test 10

Into 20 ml of an aqueous solution produced by dissolving 2.92 g of vanadium pentaoxide and 6.73 g of oxalic acid in water, 20 ml of the carrier of Example 24 was dipped for 3 hours. The solid was filtered, dried and calcined as in Test 1, to obtain a catalyst containing 5 wt.% of vanadium oxide supported on titanium oxide carrier. The results of the reduction of $NO_x$ by using the catalyst are shown in Table 1.

Test 11

Into 20 ml of an aqueous solution of vanadium oxalate produced by dissolving 3.01 g of vanadium oxide and 6.92 g of oxalic acid in water, 20 ml of the carrier of Example 27 was dipped for 3 hours. The solid was filtered, dried and calcined at 500° C for 3 hours in an air-stream to obtain a catalyst containing 5 wt.% of vanadium oxide supported on titanium oxide-alumina carrier. The results of the reduction of $NO_x$ by using the catalyst are shown in Table 1.

Test 12

Into 20 ml of an aqueous solution of vanadium oxalate produced by dissolving 3.29 g of vanadium pentaoxide and 7.57 g of oxalic acid in water, 20 ml of the carrier of Example 29 was dipped for 3 hours. The solid was filtered, dried and calcined as in Test 1 to obtain a catalyst containing 5 wt.% of vanadium oxide supported on titanium oxide-alumina carrier. The results of the reduction of $NO_x$ by using the catalyst are shown in Table 1.

Table 1

| Test No. | Carrier Exp. No. | Shaping method | Additive | Acid treatment | Reaction temp. (° C) | Reduction of $NO_x$ (%) |
|---|---|---|---|---|---|---|
| 1 | 3 | extrusion | $HNO_3$ | | 250 | 66 |
| | | | | | 300 | 80 |
| | | | | | 350 | 87 |
| | | | | | 380 | 89 |
| | | | | | 400 | 90 |
| | | | | | 420 | 89 |
| | | | | | 440 | 87 |
| | | | | | 480 | 77 |
| 2 | 6 | extrusion | oxalic acid | | 250 | 71 |
| | | | | | 300 | 83 |
| | | | | | 350 | 90 |
| | | | | | 400 | 91 |
| | | | | | 430 | 90 |
| 3 | 12 | extrusion spherical pellet | PVA | Acetic acid | 300 | 78 |
| | | | | | 350 | 85 |
| | | | | | 380 | 89 |
| | | | | | 400 | 89 |
| | | | | | 420 | 88 |
| 4 | 14 | extrusion spherical pellet | PVA acetic acid | | 300 | 82 |
| | | | | | 350 | 89 |
| | | | | | 380 | 91 |
| | | | | | 400 | 91 |
| | | | | | 420 | 88 |
| 5 | 7 | extrusion | $Ti(OH)_2$ acetic acid | | 300 | 83 |
| | | | | | 350 | 90 |
| | | | | | 380 | 92 |
| | | | | | 420 | 92 |
| | | | | | 440 | 90 |
| 6 | 9 | extrusion | titania sol $HNO_3$ | | 300 | 81 |
| | | | | | 350 | 89 |
| | | | | | 380 | 90 |
| | | | | | 420 | 90 |
| | | | | | 450 | 87 |
| 7 | 16 | extrusion | $Al_2O_3$ 10 wt.% acetic acid | | 250 | 66 |
| | | | | | 300 | 79 |
| | | | | | 350 | 87 |
| | | | | | 380 | 89 |
| | | | | | 400 | 89 |
| | | | | | 430 | 87 |
| 8 | 15 | extrusion | $Al_2O_3$ 10 wt.% $HNO_3$ | | 250 | 65 |
| | | | | | 300 | 79 |
| | | | | | 350 | 86 |
| | | | | | 380 | 88 |
| | | | | | 400 | 89 |
| | | | | | 420 | 88 |
| | | | | | 440 | 86 |
| 9 | 23 | tablet | | 6%$HNO_3$ treatment | 250 | 61 |
| | | | | | 300 | 76 |
| | | | | | 350 | 85 |
| | | | | | 380 | 87 |
| | | | | | 400 | 88 |
| | | | | | 420 | 88 |
| | | | | | 450 | 85 |
| 10 | 24 | tablet | | acetic acid treatment | 250 | 54 |
| | | | | | 300 | 71 |
| | | | | | 350 | 80 |
| | | | | | 400 | 85 |
| | | | | | 420 | 86 |
| | | | | | 450 | 85 |
| 11 | 27 | tablet | $Al_2O_3$ 10 wt.% | conc. $HNO_3$ treatment | 250 | 58 |
| | | | | | 300 | 72 |
| | | | | | 350 | 80 |
| | | | | | 380 | 84 |
| | | | | | 400 | 86 |
| | | | | | 420 | 84 |
| | | | | | 450 | 80 |
| 12 | 29 | tablet | $Al_2O_3$ 10 wt.% | 10% acetic acid treatment | 250 | 54 |
| | | | | | 300 | 70 |
| | | | | | 350 | 79 |
| | | | | | 380 | 84 |
| | | | | | 400 | 85 |
| | | | | | 420 | 86 |
| | | | | | 440 | 85 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a shaped titanium oxide catalyst carrier which comprises calcining titanium oxide at 400° C – 800° C then adding to said calcined titanium oxide a mineral acid or carboxylic acid and alumina or a precursor of alumina selected from the group consisting of aluminum hydroxide, alimina sols and aluminum salts, shaping the mixture and then calcining the shaped material at 300° C – 800° C.

2. The process of claim 1, wherein 0.01 – 50 wt.% of nitric acid, acetic acid or oxalic acid and 0.1 – 20 wt.% of alumina or said precursor of alumina calculated as $Al_2O_3$ to total solid are added to titanium oxide.

3. A process for preparing a shaped titanium oxide catalyst carrier which consists essentially of calcining titanium oxide at 400° C – 800° C as a first calcining step, then shaping the titanium oxide and then calcining the shaped material at 300° C – 800° C as a second calcining step.

4. The process of claim 3, wherein the titanium oxide is produced by hydrolyzing a titanate.

5. A process for preparing a shaped titanium oxide catalyst carrier which consists essentially of calcining titanium oxide at 400° C – 800° C, then adding a precursor of titanium oxide selected from the group consisting of titanium hydroxide, titania sols and titanic acid esters, shaping the mixture and calcining the shaped material at 300° C – 800° C.

6. The process of claim 5, wherein 0.1 – 20 wt.% of said precursor of titanium oxide calculated as $TiO_2$ to total solid is added.

7. A process for preparing a shaped titanium oxide catalyst carrier which comprises calcining titanium oxide at 400° C – 800° C, then adding polyvinyl alcohol, extruding and granulating it to form spherical pellets and then calcining the shaped pellets at 300° C – 800° C.

8. The process of claim 7, wherein 0.1 – 10 wt.% of polyvinyl alcohol to titanium oxide is added.

9. A process for preparing a shaped titanium oxide catalyst carrier which consists essentially of calcining titanium oxide at 400° C – 800° C, then adding a mineral acid or carboxylic acid, shaping the mixture and calcining the shaped material at 300° C – 800° C.

10. The process of claim 9, wherein 0.01 – 50 wt.% of nitric acid, acetic acid or oxalic acid is added to titanium oxide.

11. The process of claim 9, wherein 0.1 – 20 wt.% of a precursor of titanium oxide selected from the group consisting of titanium hydroxide, titania sols and titanic acid esters calculated as $TiO_2$ to total solid is added to the titanium oxide.

12. The process of claim 11, wherein 0.1 – 50 wt.% of said acid is added to titanium oxide.

13. The process of claim 7, wherein a mineral acid or carboxylic acid is added.

14. The process of claim 13, wherein 0.01 – 50 wt.% of nitric acid, acetic acid or oxalic acid is added to titanium oxide.

15. A process for preparing a shaped titanium oxide catalyst carrier which consists essentially of calcining titanium oxide at 400° C – 800° C, shaping it, contacting the shaped material with a mineral acid or carboxylic acid and then calcining the shaped material at 300° C – 800° C.

16. The process of claim 15, where 0.1 – 20 wt.% of alumina or a precursor of alumina selected from the group consisting of aluminum hydroxide, alumina sols and aluminum salts calculated as $Al_2O_3$ to total solid is added to titanium oxide before shaping.

* * * * *